No. 647,223. Patented Apr. 10, 1900.
D. ELLENWOOD.
ATTACHMENT FOR PLOWS.
(Application filed Feb. 16, 1900.)
(No Model.)
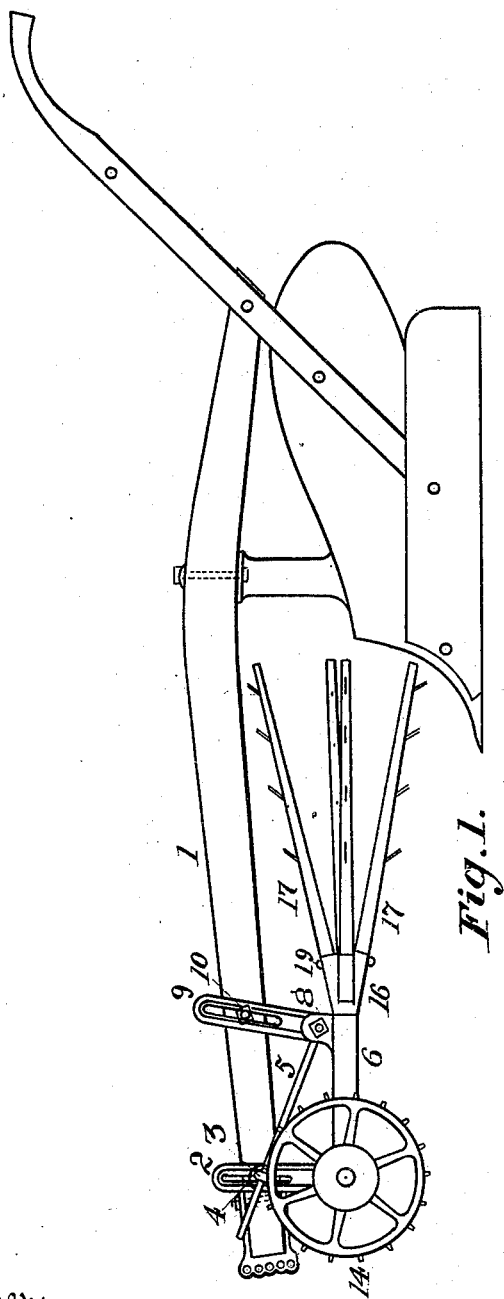
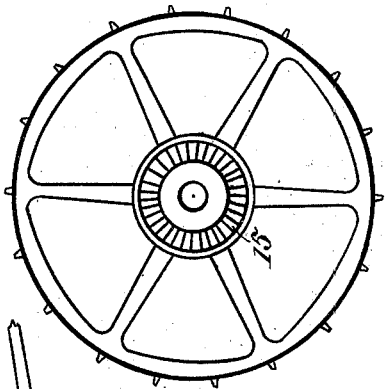
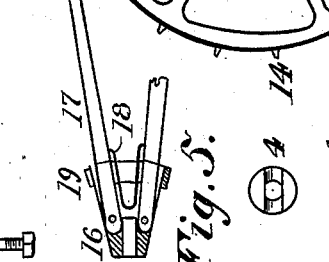
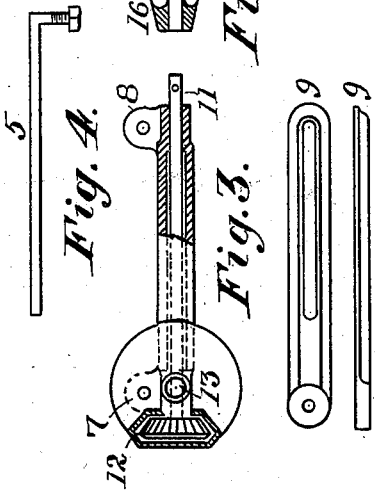
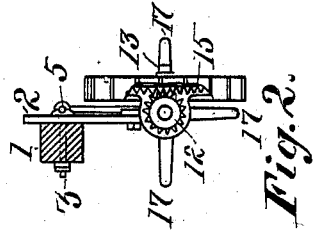
Witnesses
A. D. Alexander
Wm. T. Good.
Inventor
Daniel Ellenwood,
By his Attorneys
Humphrey & Humphrey.
THE NORRIS PETERS CO., PHOTO-LITHO., WASHINGTON, D. C.

UNITED STATES PATENT OFFICE.

DANIEL ELLENWOOD, OF EVERETT, OHIO.

ATTACHMENT FOR PLOWS.

SPECIFICATION forming part of Letters Patent No. 647,223, dated April 10, 1900.

Application filed February 16, 1900. Serial No. 5,457. (No model.)

*To all whom it may concern:*

Be it known that I, DANIEL ELLENWOOD, a citizen of the United States, residing at Everett, in the county of Summit and State of Ohio, have invented a certain new and useful Improvement in Attachments for Plows, of which the following is a specification.

My invention has relation to improvements in devices to be attached to plows for the purpose of brushing straw, grass, coarse manure, and like substances into the path of the plow, so that they may be turned under the furrow and covered and prevented from catching on and clogging the plowshare.

One object of my invention is to provide simple and effective mechanism by which a number of toothed sweeps or rakes shall be revolved about a central line in front of the plowshare and moldboard and pass transversely across the ground to sweep loose material to one side to be covered in the furrow.

A further object is to make the rake-arms flexibly adjustable, so that they will accommodate themselves to the inequalities of the ground, and a final object is to provide appliances by which the mechanism may be readily and quickly applied to any plow.

To the aforesaid objects my invention consists in the peculiar and novel construction, arrangement, and combination of parts hereinafter described, and specifically pointed out in the claims, reference being had to the accompanying drawings, forming a part of this specification.

In the accompanying drawings, in which similar reference-numerals indicate like parts in the different views, Figure 1 is an elevation of a plow provided with my invention; Fig. 2, a front elevation of the wheel and connected mechanism with the plow-beam in section; Fig. 3, an enlarged view of the sweep-driving shaft and gear with case partly in section; Fig. 4, the brace-rod hereinafter described; Fig. 5, the head of the sweep in section to show the construction; Fig. 6, the wheel enlarged, showing the driving-gear; Fig. 7, front and edge elevations of the slotted bar to adjustably support the shaft-case, and Fig. 8 front and edge elevations of the washer for holding the brace-rod.

Referring to the figures, 1 is the plow-beam, to which is adjustably secured a slotted wheel-standard 2 by means of a hooked or ring bolt 3, that passes through a washer 4, having a transverse groove in its face, in which the eye of the ring-bolt sinks, and a brace-rod 5, to be further described, is placed through the eye of the ring-bolt and drawn down against the higher parts of the washer 4 as the ring-bolt nests in the groove. To the lower end of the standard 2 is secured a tubular case 6 by means of ears 7 8, having a hooded end to protect the bevel-gear, to be described. The rear end of this case 6 is adjustably secured to the plow by a slotted bar 9, held by a bolt 10, through the lower end of which bar and the ear 8 the bent end of the brace-rod 5 passes and is secured by a nut. The inner ends of the case 6 are reduced and turned accurately to form journal-bearings, and in these bearings is a shaft 11, that bears at its front end a beveled pinion 12, that rests inside of the hooded end, the rear end of this shaft projecting beyond the case. From one side of the case 6 extends a wrist 13, on which is mounted a wheel 14, having bosses or projections on its periphery to secure traction and bearing an internal gear 15, that meshes in the pinion 12. On the rear end of the shaft 11 is secured a head 16, in which are pivotally mounted the front ends of four bars 17, having in their outer faces a number of teeth. The bars are so arranged as to rock inward, and thus yield in passing over the ground, and are constantly forced outward by springs 18, but limited in their outward movement by the reinforcing-ring 19 of the head 16.

In operation the case 6 will be adjusted by means of the wheel-standard 2 and slotted bar 9 to the desired height, and as the plow moves forward the bars 17 will revolve with the head 16 immediately in front of the plowshare and throw all rubbish into the furrow to be covered. In this operation the arms will yield toward the line of their rotation to pass over uneven places and obstacles, but resume their position by force of the springs 18.

I claim as my invention—

1. In combination with a plow a revolving head bearing rakes adapted to revolve in front of the plowshare transverse to its motion to sweep loose material into the furrow and means such substantially as shown to actuate said head, substantially as shown and described.

2. In combination with a plow, a revolving head bearing rakes adapted to revolve in front of the plowshare transverse to its motion to sweep loose material into the furrow, means for actuating said head and adjusting devices to regulate its height from the ground, substantially as shown and described.

3. In combination with a plow a revolving head bearing rakes pivotally mounted in said head adapted to revolve in front of the plowshare transverse to its motion, to sweep loose material into the furrow, means for actuating said head and springs to press said rakes outward from the axial line of said head, substantially as shown and described.

4. In combination with a plow an adjustable wheel-standard and a slotted bar attached to the beam back of said standard a supporting-case held by said standard and bar, a shaft journaled in said case bearing a rake-head having rakes extending diagonally toward the plowshare and at the front a beveled pinion and a wheel journaled on a wrist connected with said standard, having a gear to mesh in said pinion, substantially as shown and described.

In testimony that I claim the above I hereunto set my hand in the presence of two subscribing witnesses.

DANIEL ELLENWOOD.

In presence of—
  C. P. HUMPHREY,
  C. E. HUMPHREY.